UNITED STATES PATENT OFFICE.

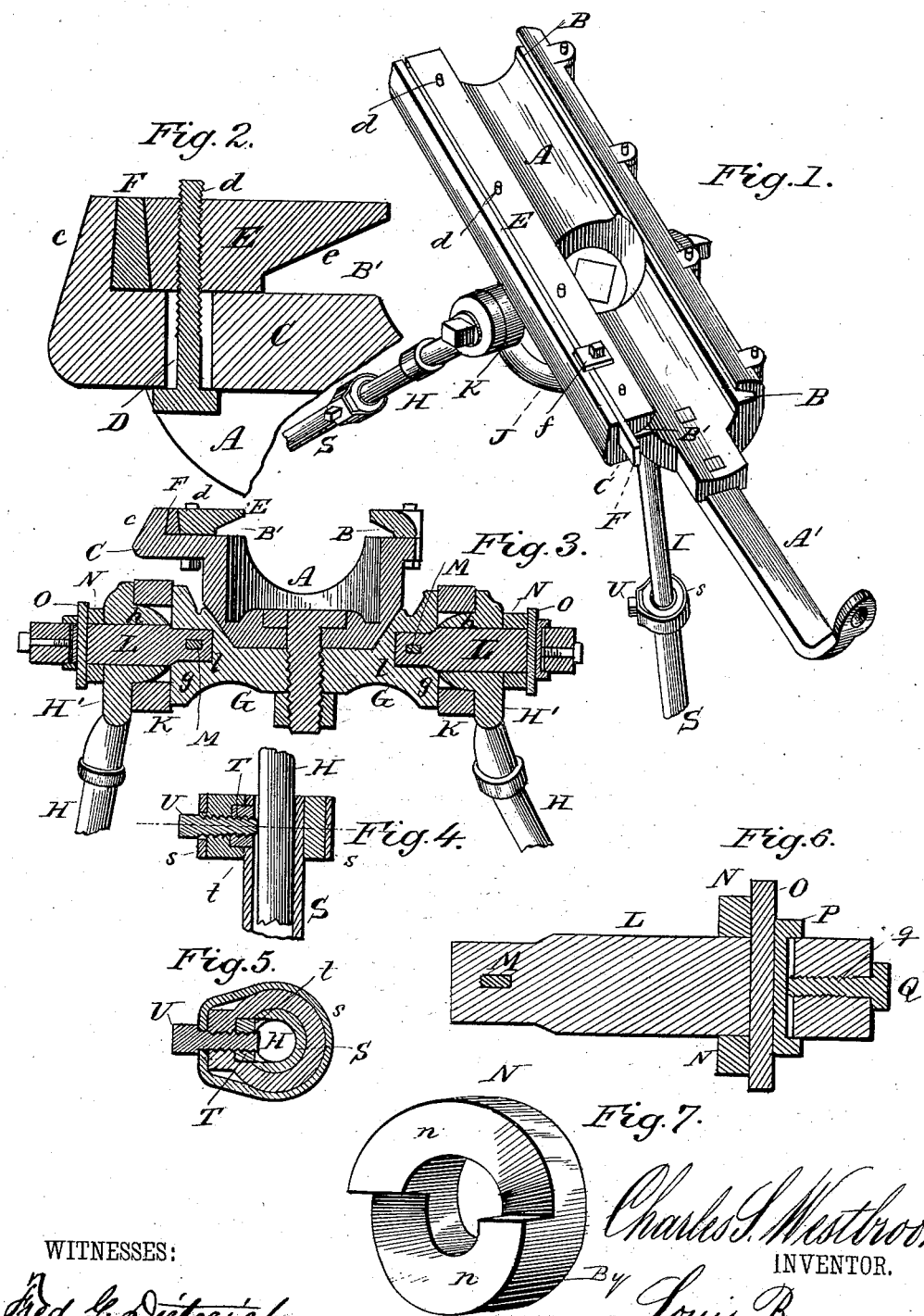

CHARLES S. WESTBROOK, OF SPRAGUEVILLE, NEW YORK.

SUPPORT FOR ROCK-DRILLS.

SPECIFICATION forming part of Letters Patent No. 312,539, dated February 17, 1885.

Application filed October 20, 1884. (No model.)

*To all whom it may concern:*

Be it known that I, CHARLES S. WESTBROOK, a citizen of the United States, and a resident of Spragueville, in the county of St. Lawrence and State of New York, have invented certain new and useful Improvements in Supports for Rock-Drills; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved support for rock-drills. Fig. 2 is a cross-section of a portion of the cradle removed from the tripod. Fig. 3 is a sectional view of the cradle and the saddle with its bearings. Fig. 4 is a similar view of a portion of one of the extensible legs of the tripod. Fig. 5 is a horizontal sectional view of the same, and Figs. 6 and 7 are detail views of the several parts of the device for locking the legs of the tripod against the sides of the saddle.

Similar letters of reference indicate corresponding parts in all the figures.

My invention has relation to the support or bearing for rock-drills, and is applicable to drills operated by steam, compressed air, or any other suitable medium, and of any desired construction.

The object of my improvement is, first, to compensate for wear of the ways or guides in the cradle in which the drill works; secondly, to compensate for wear at the point where the legs of the tripod are connected to the saddle which supports the cradle; thirdly, to provide means whereby the several parts of the tripod may be locked or fastened together after they have been properly adjusted, so as to avoid accidental displacement of the drill; and, fourthly, to avoid the labor, expense, and loss of time incident to retapping of the extensible legs, which form the tripod when the set-screws become worn.

In the accompanying drawings, A denotes the cradle or carriage in which the drill (not shown in the drawings) works. This cradle has the usual extension, A', in which the feed-screw works, by means of which the drill is fed forward as it progresses into the rock. The cradle has on one side a groove, B, preferably of a V shape in cross-section, and on the other side a flat-topped projection, C, having a series of oblong transverse slots, D, through which nutted bolts d are inserted, by means of which the plate E is fastened adjustably to the part C. This plate is beveled on one side, as shown at e, so as to form, with the part C, a guide groove or way, B', corresponding to the parallel groove B on the other side of the cradle. The laterally-projecting part C has a flange, c, on the outside, between which and the adjacent side of the adjustable guide-plate E a wedge-shaped key, F, is inserted and held in place by an overlapping plate, f, fashioned upon either one of the parts E or C so as to overlap the key. The parallel ways B and B' receive the flanges or projections on the body of the drill, and as these ways become worn wear may be taken up or compensated for by driving in the key or wedge F in the direction of its narrowest part longitudinally, which can be done in a moment of time and without stopping the operation of the drill. I thus prevent lost motion and cause the drill to work absolutely true at all times.

The saddle G, which supports the cradle, has the usual extensible side legs, H H, and the back leg, I, which form the tripod. The latter carries at its upper end the yoke or fork J, the two ends of which form collars K, which bear against the sides g of the saddle, and are clamped against them by the hips H' H' of the side legs, H. Said hips H' have projections h, which fit inside of the collars, and are perforated centrally for the insertion of a bolt, L, the inner end of which fits into a bore or recess, l, in the sides g of the saddle, and is held therein by a key, M.

Placed upon the projecting outer ends of each of the two side bolts or trunnions, L, is a washer, N, of peculiar construction. This washer, as will be seen by reference to Fig. 7, consists of a plate with a central hole for the insertion of the bolt, and having on one side two projections, n n, forming inclined planes on opposite sides of the bolt-hole, and bearing with the said inclined planes against a key, O, which is inserted transversely through the head of the trunnion-bolt L, and held in place therein by a gib, P, which is in turn held in place by a set-screw, Q, working in a screw-threaded bore, g, centrally in the trunnion-bolts L, Fig. 6. It follows that by turning the disks or washers N upon their bolts L so as to wedge their inclines n against the sides of the keys O bearing against them the several connecting parts of the saddle and tripod will be locked together by friction, and thus prevent slipping or displacement of the legs after these have once been properly adjusted. As the inclined planes on the washer-plates point in opposite directions on opposite sides of the saddle, it follows that one of them will bind when the other loosens, and vice versa, like the nuts upon a right and left hand threaded screw, so that the hips will always bind firmly against the saddle; and if it is desired to release the parts from their locked position all that is necessary is to loosen the keys, which gives play to the several connecting parts of the saddle and tripod, so that they may readily be moved and their relative position changed. The plates or washers N also operate to take up wear between the saddle and its adjacent parts, as their wedges or inclines can always and readily be so adjusted as to tie the several parts together and compensate for wear. The extensible or telescopic legs consist each of a solid upper part, which is screwed into the hip, and a lower tubular part, S. The upper end of the tube S has a square aperture, t, cut through one side, adapted to fit an ordinary nut, T, and covered on the outside by a band or collar, s, through which the set screw or bolt U is inserted with its inner end working through the removable nut T against the solid upper part of the leg.

By making the lower part of the extensible legs tubular, instead of the upper part, as usual in tripods for rock-drills, the set-screw U is placed near the upper end of the leg, or at some distance from its lower end, so as not to be affected by the dirt and débris which accumulate around the tripod in working the drill, and which, by getting into the threads of the screw or bolt, are apt to render its operation difficult.

When the threads in the nut wear out, a a new nut can readily be substituted, thus avoiding retapping, as when the screw-threads are cut in the walls of the tube, and the cost, labor, and delay incident to the cutting of new threads.

By carrying a few extra nuts and bolts in his pocket the workman operating the drill can always renew an old and worn-out nut and bolt, when necessary, without having to remove the drill from the place where it is in use.

Having thus described my invention, I claim and desire to secure by Letters Patent of the United States—

1. In a support for rock-drills, the combination of the cradle or carriage constructed with the fixed guide-groove on one side and the flat-topped flanged ledge or lateral projection on the opposite side, having oblong bolt-holes, the laterally-adjustable guide-plate, the bolts connecting the same movably to the flanged projection, the wedge disposed between the adjustable guide-plate and the flange on the projection, and of a length approximating the length of the cradle, and the holding-plate which overlaps the wedge, substantially as and for the purpose shown and set forth.

2. The combination, in a support for rock-drills, of the saddle having transverse apertures adapted to receive the keys M, the trunnion-bolts, the keys fixing the same rigidly to the saddle, the collared yoke or fork of the back leg, the hips of the side legs having projections fitting into said collars, the centrally-perforated binding-plates having inclined planes on opposite sides of the central aperture, and the fixed keys, against which said inclined planes bear on diametrically-opposite sides of the central trunnion, substantially as and for the purpose shown and set forth.

3. The combination, in a support for rock-drills, of the saddle, the keys M, inserted transversely through the sides of the saddle and the inner ends of the trunnions, the collared yoke of the back leg, the hips of the side legs, the centrally-perforated binding-plates having inclined planes on opposite sides of the central aperture, the keys against which said inclined planes bear, the trunnions having a central screw-threaded bore and a transverse slot intersecting the same, the gibs inserted into said slots, and the screws working in the central recess in the trunnions and bearing with their inner ends against the gibs, substantially as and for the purpose shown and set forth.

In testimony that I claim the foregoing as my own I have hereunto affixed my signature in presence of two witnesses.

CHARLES S. WESTBROOK.

Witnesses:
AUGUST PETERSON,
ARTHUR L. MORSELL.